United States Patent
Miyakoshi

(10) Patent No.: US 10,556,764 B2
(45) Date of Patent: Feb. 11, 2020

(54) SENSOR UNIT AND IMAGE FORMING APPARATUS THEREWITH

(71) Applicant: KYOCERA Document Solutions Inc., Osaka (JP)

(72) Inventor: Naoto Miyakoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/282,056

(22) Filed: Feb. 21, 2019

(65) Prior Publication Data

US 2019/0291991 A1    Sep. 26, 2019

(30) Foreign Application Priority Data

Mar. 22, 2018 (JP) ................. 2018-053886
Mar. 22, 2018 (JP) ................. 2018-053890

(51) Int. Cl.
*H04N 1/04*      (2006.01)
*B65H 7/06*      (2006.01)
*B65H 7/14*      (2006.01)
*H04N 1/00*      (2006.01)

(52) U.S. Cl.
CPC ............. *B65H 7/06* (2013.01); *B65H 7/14* (2013.01); *H04N 1/00748* (2013.01); *B65H 2553/822* (2013.01); *B65H 2701/1315* (2013.01)

(58) Field of Classification Search
CPC ...... B65H 7/06; B65H 7/14; B65H 2553/822; B65H 2701/1315; H04N 1/00748
USPC ................. 358/488, 482, 483, 496
See application file for complete search history.

(56) References Cited

U.S. PATENT DOCUMENTS

| | | | | |
|---|---|---|---|---|
| 6,390,698 B1 * | 5/2002 | Yoshida | ............... | B41J 19/202 400/283 |
| 9,284,150 B2 * | 3/2016 | Nakano | ............. | A61F 13/15772 |
| 2008/0044216 A1 * | 2/2008 | Kim | ..................... | B41J 11/003 400/708 |
| 2012/0286468 A1 * | 11/2012 | Ui | ......................... | B65H 7/06 271/228 |
| 2013/0074720 A1 * | 3/2013 | Yamauchi | ............... | B41J 29/38 101/485 |

(Continued)

FOREIGN PATENT DOCUMENTS

| | | |
|---|---|---|
| JP | 2003-327345 A | 11/2003 |
| JP | 2012116577 A * | 6/2012 |
| JP | 2016-145814 A | 8/2016 |

*Primary Examiner* — Cheukfan Lee
(74) *Attorney, Agent, or Firm* — Stein IP, LLC

(57) ABSTRACT

A sensor unit includes an edge detection sensor, a sensor carriage, a unit housing, and a carriage moving mechanism. The edge detection sensor is arranged in a conveying portion for conveying a sheet and senses edge positions at both sides in a sheet width direction perpendicular to a sheet conveying direction. The sensor carriage has a carriage main body in which the edge detection sensor is incorporated, and is reciprocatably supported on the unit housing in the sheet width direction. The carriage moving mechanism makes the sensor carriage reciprocate in the sheet width direction. The sensor carriage is selectively positioned at a first position where it makes contact with a first side face at one end side of the unit housing in the sheet width direction or a second position where it makes contact with a second side face at the other end side in the sheet width direction.

11 Claims, 12 Drawing Sheets

(56) References Cited

U.S. PATENT DOCUMENTS

| | | | |
|---|---|---|---|
| 2013/0156478 A1* | 6/2013 | Deno | G03G 15/6567 |
| | | | 399/395 |
| 2014/0140744 A1* | 5/2014 | Akai | G03G 15/607 |
| | | | 399/371 |
| 2016/0221778 A1 | 8/2016 | Ueda et al. | |
| 2017/0153592 A1* | 6/2017 | Hashizume | G03G 15/55 |
| 2017/0259447 A1* | 9/2017 | Takatsu | B26D 5/007 |
| 2017/0302804 A1* | 10/2017 | Rokuhara | H04N 1/00604 |
| 2017/0341892 A1* | 11/2017 | Yamane | B65H 9/002 |
| 2018/0105386 A1* | 4/2018 | Egawa | B65H 5/00 |
| 2018/0194581 A1* | 7/2018 | Matsumoto | B65H 7/08 |

* cited by examiner

SENSOR UNIT AND IMAGE FORMING APPARATUS THEREWITH

INCORPORATION BY REFERENCE

This application is based upon and claims the benefit of priority from the corresponding Japanese Patent Applications No. 2018-53886 filed on Mar. 22, 2018 and No. 2018-53890 filed on Mar. 22, 2018, the entire contents of which are incorporated herein by reference.

BACKGROUND

The present disclosure relates to a sensor unit which is incorporated in image forming apparatuses such as facsimile machines, copiers, and printers and which includes a sensor for sensing the edge of a recording medium in sheet form, and also relates to image forming apparatuses provided with such a sensor unit.

Image forming apparatuses such as facsimile machines, copiers, and printers are configured to record an image on a recording medium such as paper, cloth, and OHP sheets. These image forming apparatuses can be classified into an electrophotographic type, an ink-jet type, etc. based on the recording method.

During printing on a recording medium using an image forming apparatus, if the recording medium deviates in the direction (recording medium width direction) perpendicular to the conveying direction, the printing position on each recording medium deviates. Thus, for example in a case where binding is performed after printing, high accuracy in the printing position on each page is required. In particular, if an ink-jet recording apparatus is used, ink is prone to soak through to the rear face of the recording medium, and thus very high accuracy (for example, several tenths of a millimeter or less) in the printing position is required in double-sided printing.

To cope with that, in conventional image forming apparatuses, there is arranged a CIS (contact image sensor), facing a conveying belt for conveying a sheet (recording medium), for sensing the position of an end part of a sheet in its width direction. This image forming apparatus senses the position of an end part of a sheet in its width direction based on the difference in the intensity of the light received by the CIS with and without a sheet.

For example, a known image forming apparatus is provided with a deviation amount sensing means, an error sheet sensing means, a double-side path sheet sensing means, a conveyance source judging means, and a sheet discharging means. The deviation amount sensing means senses the lateral deviation amount and the skew amount of a sheet with a CIS. The error sheet sensing means, when the sensed deviation amount of a sheet is larger than a predetermined threshold value, judges the sheet to be an error sheet and senses its appearance. The double-side path sheet sensing means, when an error sheet appears, senses whether a sheet is present in the double side path. The conveyance source judging means, when a sheet is present in the double side path, judges whether the error sheet is a sheet conveyed from a sheet storing portion or a sheet conveyed through the double side path. The sheet discharging means determines the sheet to be discharged based on the judgement result and discharges the determined sheet.

A known edge sensing device binarizes the output value of a CIS arranged in a conveying passage of a conveyed object (sheet), and when the position at which the binarized value changes is within an edge sensing range which is stored for each conveyed object size, judges the position to be the edge position of the conveyed object. Also known is shifting a conveyed object in the width direction based on the deviation amount between a sensed edge position and a reference position.

SUMMARY

According to one aspect of the present disclosure, a sensor unit includes an edge detection sensor, a sensor carriage, a unit housing, and a carriage moving mechanism. The edge detection sensor is arranged in a conveying portion for conveying a sheet and senses an edge position in the sheet width direction perpendicular to the sheet conveying direction. The sensor carriage includes a carriage main body in which the edge detection sensor is incorporated. The unit housing houses the sensor carriage and reciprocatably supports the sensor carriage in the sheet width direction. The carriage moving mechanism makes the sensor carriage reciprocate in the sheet width direction. The sensor carriage is selectively positioned at a first position where it makes contact with a first side face at one end side of the unit housing in the sheet width direction or a second position where it makes contact with a second side face at the other end side in the sheet width direction.

This and other objects of the present disclosure, and the specific benefits obtained according to the present disclosure, will become apparent from the description of embodiments which follows.

DETAILED DESCRIPTION

Figure 1:
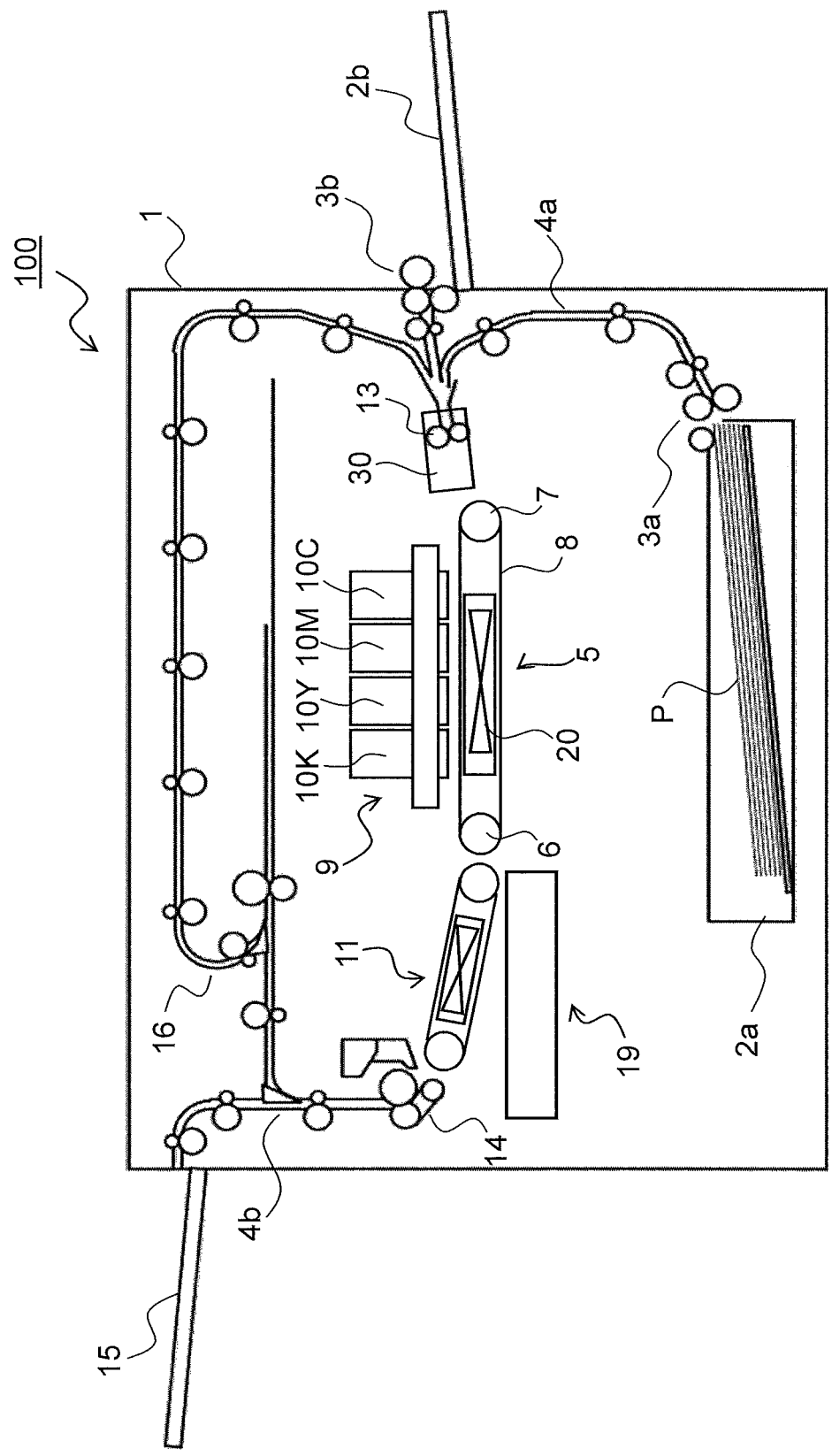
FIG. 1 is a cross-sectional side view showing the general construction of a printer provided with a sensor unit according to one embodiment of the present disclosure.

Hereinafter, with reference to the accompanying drawings, embodiments of the present disclosure will be described. FIG. 1 is a cross-sectional side view showing the general construction of a printer 100 of an ink-jet recording type provided with a sensor unit 30 according to one embodiment of the present disclosure.

As shown in FIG. 1, the printer 100 has a sheet feeding cassette 2a as a sheet storage portion arranged in a lower part inside a printer main body 1, and on the outside of the right side face of the printer main body 1, a manual feed tray 2b is provided. On the downstream side of the sheet feeding cassette 2a in the sheet conveying direction (on the right side of the sheet feeding cassette 2a in FIG. 1), above it, a sheet feeding device 3a is arranged. On the downstream side of the manual feed tray 2b in the sheet conveying direction (on the left side of the manual feed tray 2b in FIG. 1), a sheet feeding device 3b is arranged. By the sheet feeding devices 3a and 3b, sheets P are separated and fed out one after another.

Inside the printer 100, a first sheet conveying passage 4a is provided. The first sheet conveying passage 4a is located to the upper right of the sheet feeding cassette 2a and to the left of the manual feed tray 2b. Sheets P fed out of the sheet feeding cassette 2a are conveyed vertically upward along a side face of the printer main body 1 via the first sheet conveying passage 4a, and sheets fed out of the manual feed tray 2b are conveyed to the left in a substantially horizontal direction via the first sheet conveying passage 4a.

At the downstream end of the first sheet conveying passage 4a in the sheet conveying direction, the sensor unit 30 for sensing the position (edge position) of an end part of a sheet P in its width direction (the direction perpendicular to the sheet conveying direction) is arranged. On the downstream side of the sensor unit 30, close to it, a first belt conveying portion 5 and a recording portion 9 are arranged.

In the sensor unit 30, a registration roller pair 13 is provided. The registration roller pair 13, while correcting skewed conveying of sheets P and coordinating with the timing of ink ejecting operation by the recording portion 9, feeds out the sheets P toward the first belt conveying portion 5. The structure of the sensor unit 30 will be described in detail later.

The first belt conveying portion 5 is provided with an endless first conveying belt 8 that is wound around a first driving roller 6 and a first driven roller 7. In the first conveying belt 8, a large number of suction holes (unillustrated) for sucking in air are provided. A sheet P fed out from the registration roller pair 13 is, while being held by absorption on the first conveying belt 8 by a sheet absorbing portion 20 provided inside the first conveying belt 8, passes under the recording portion 9.

The recording portion 9 includes line heads 10C, 10M, 10Y and 10K. The line heads 100 to 10K record an image on a sheet P conveyed while being held by absorption on the conveying face of the first conveying belt 8. To the line heads 10C to 10K, ink of four colors (cyan, magenta, yellow, and black) stored in ink tanks (unillustrated) is supplied such that ink of the different colors are supplied to corresponding ones of the line heads 10C to 10K respectively.

Toward a sheet P absorbed on the first conveying belt 8, ink of the respective colors is sequentially ejected from the line heads 10C to 10K. With this, a full-color image having ink of four colors, namely cyan, magenta, yellow and black, overlaid together is recorded on the sheet P. The printer 100 can record also a monochrome image.

On the downstream side (left side in FIG. 1) of the first belt conveying portion 5 in the sheet conveying direction, a second belt conveying portion 11 is arranged. A sheet P having an image recorded on it at the recording portion 9 is conveyed to the second belt conveying portion 11. While the sheet P passes through the second belt conveying portion 11, the ink ejected on the surface of the sheet P is dried. Since the configuration of the second belt conveying portion 11 is similar to that of the first belt conveying portion 5, no overlapping description will be repeated.

On the downstream side of the second belt conveying portion 11 in the sheet conveying direction, near the left side face of the printer main body 1, a decurler portion 14 is provided. The sheet P with the ink dried at the second belt conveying portion 11 is conveyed to the decurler portion 14 so that the curled sheet P is straightened.

On the downstream side (in an upper part in FIG. 1) of the decurler portion 14 in the sheet conveying direction, a second sheet conveying passage 4b is provided. The sheet P that has passed through the decurler portion 14 is, when not subjected to double-sided recording, discharged from the second sheet conveying passage 4b via a discharge roller pair to a sheet discharge tray 15 provided outside the left side face of the printer 100. When recording is performed on both sides of a sheet P, the sheet P having undergone recording on its first side and having passed through the second belt conveying portion 11 and the decurler portion 14 is conveyed via the second sheet conveying passage 4b to a reversing conveying passage 16. The sheet P conveyed to the reversing conveying passage 16 has its conveying direction switched so as to be reversed between its obverse and reverse sides, and is conveyed to the registration roller pair 13 via an upper part of the printer 100. Then, with the face on which no image has been recorded yet pointing up, the sheet P is conveyed to the first belt conveying portion 5 again.

Under the second belt conveying portion 11, a maintenance unit 19 is arranged. The maintenance unit 19, when performing maintenance of the respective recording heads of the line heads 10C to 10K, moves to under the recording portion 9, where it wipes off the ink ejected (purged) from ejection nozzles in the recording heads and collects the wiped-off ink.

Figure 2:
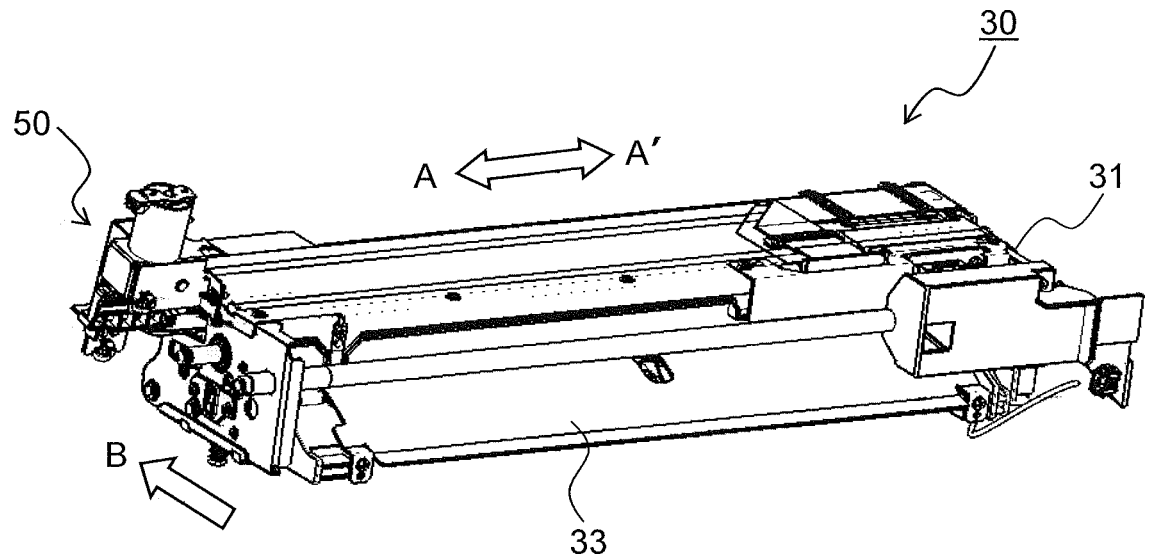
FIG. 2 is an exterior perspective view of the sensor unit of this embodiment incorporated in the printer.
Figure 3:
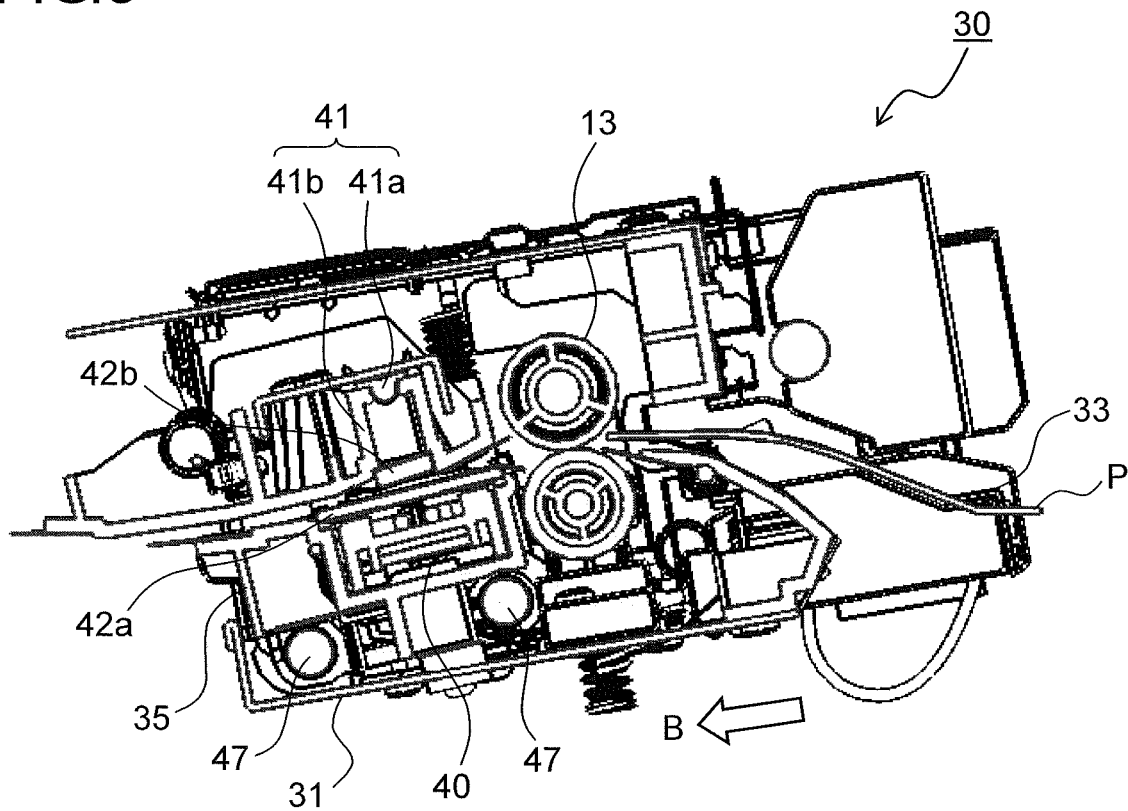
FIG. 3 is a cross-sectional side view of the sensor unit.
Figure 4:
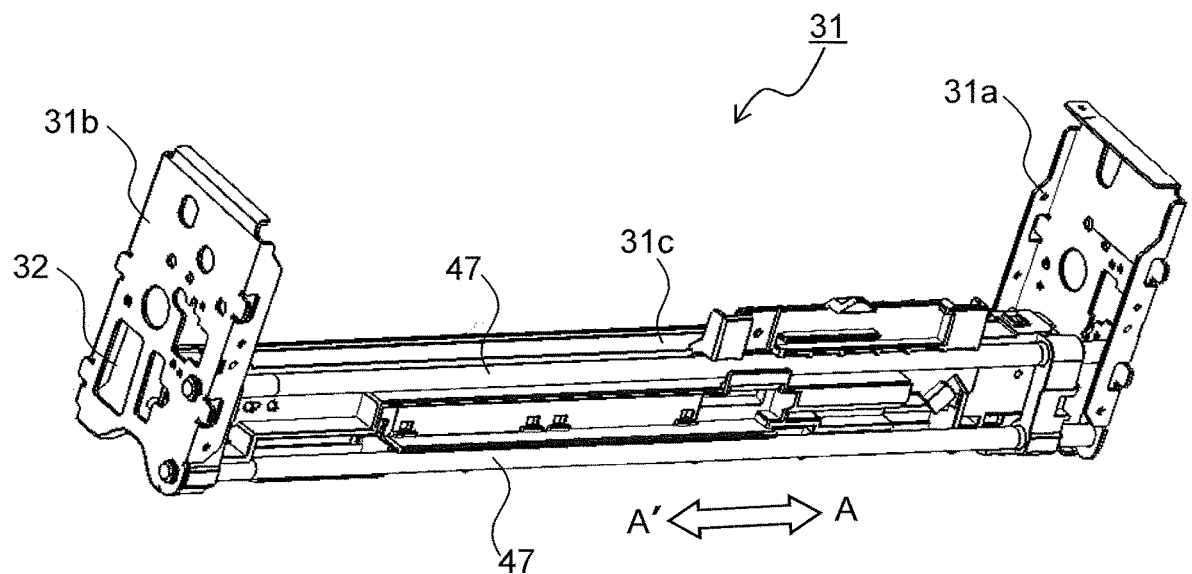
FIG. 4 is a perspective view of a frame that forms a unit housing of the sensor unit.

Next, the structure of the sensor unit 30 will be described in detail. FIG. 2 is an exterior perspective view of the sensor unit 30 incorporated in the printer 100. FIG. 3 is a cross-sectional side view of the sensor unit 30. FIG. 4 is a perspective view of a frame that forms a unit housing 31 of the sensor unit 30.

The sensor unit 30 is provided with the unit housing 31, the registration roller pair 13, a CIS carriage 35, and a carriage moving mechanism 50. The unit housing 31 rotatably supports the registration roller pair 13 as well as supports the CIS carriage 35 such that this is movable in the sheet width direction (in the arrow AA' direction). In an upstream-side end part of the unit housing 31 in the sheet conveying direction (in the arrow B direction), there is provided a registration entrance guide 33 that guides sheets P to a nip portion of the registration roller pair 13.

As shown in FIG. 4, the unit housing 31 includes side face frames 31a and 31b that are arranged on the front side and the rear side, respectively, of the printer 100 and a coupled frame 31c that is coupled with the side face frames 31a and 31b so as to bridge between them. Between the side face frame 31a and 31b, two shafts 47 that slidably support the CIS carriage 35 are fixed parallel to each other.

The CIS carriage 35 is arranged adjacent to a downstream-side (left-side in FIG. 3) part of the registration roller pair 13 in the sheet conveying direction (in the arrow B direction). The CIS carriage 35 includes a CIS 40 (edge detection sensor) and a carriage main body 37 (see FIG. 6) in which a light source portion 41 is housed. The CIS 40 and the light source portion 41 are housed in a lower part and an upper part, respectively, inside the carriage main body 37, and between the CIS 40 and the light source portion 41, two contact glasses 42a and 42b are arranged so as to face each other. The top face of the contact glass 42a and the bottom face of the contact glass 42b form a part of a sheet conveying passage.

The CIS 40, based on the light intensity difference between the part that is struck by the light from the light source portion 41 and the part that is intercepted by a sheet P, senses the edge position of a sheet P in its width direction. The light source portion 41 includes an LED 41a arranged at one end part in the sheet width direction and a light guide plate 41b that diffuses the light emitted from the LED 41a over the entire region in the sheet width direction to lead it to the CIS 40.

Figure 5:
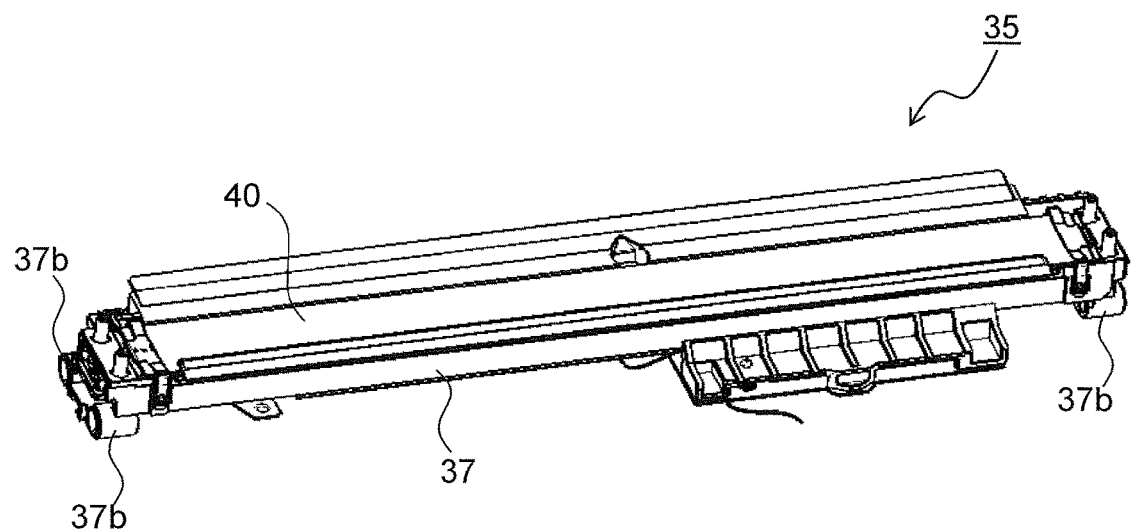
FIG. 5 is an exterior perspective view of a CIS carriage.
Figure 6:
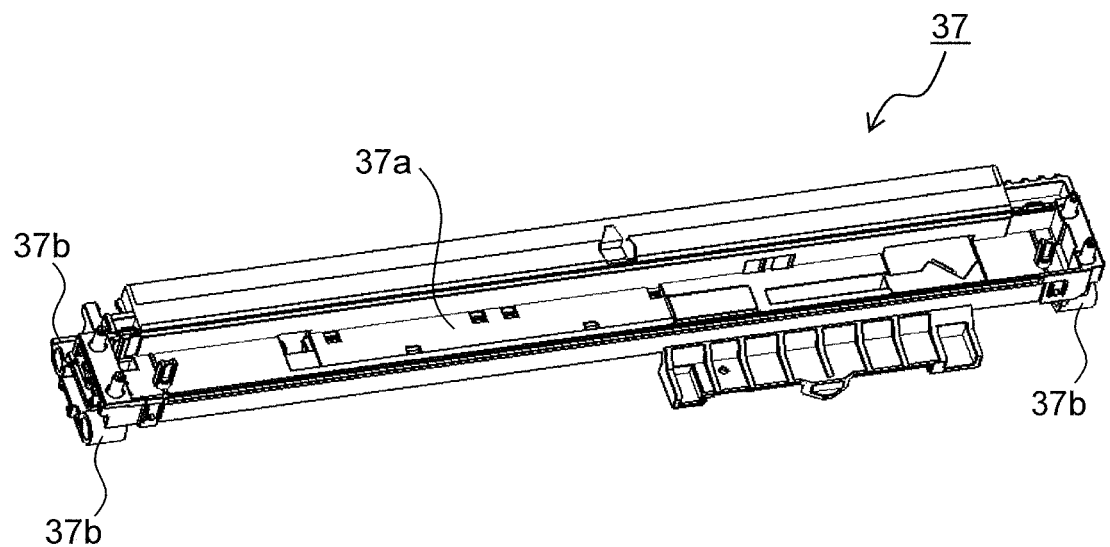
FIG. 6 is an exterior perspective view of a carriage main body that forms the CIS carriage.
Figure 7:
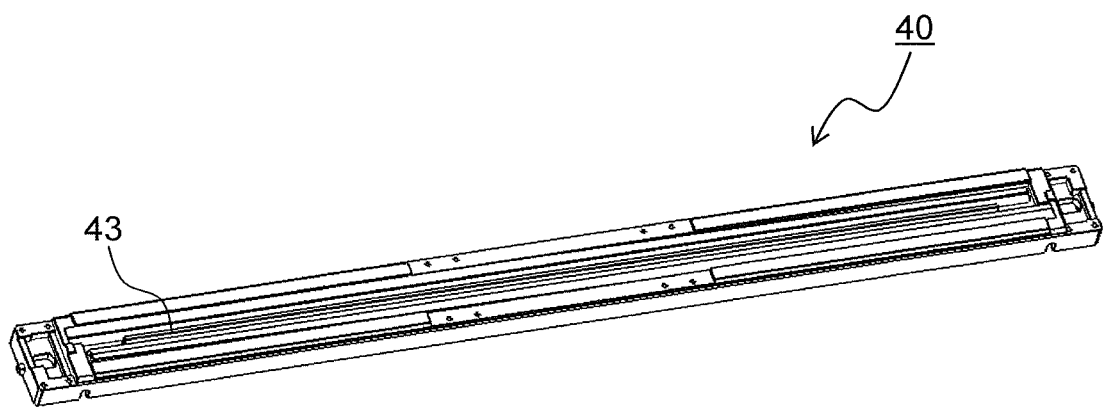
FIG. 7 is a perspective view of a CIS incorporated in the carriage main body as seen from the top.
Figure 8:
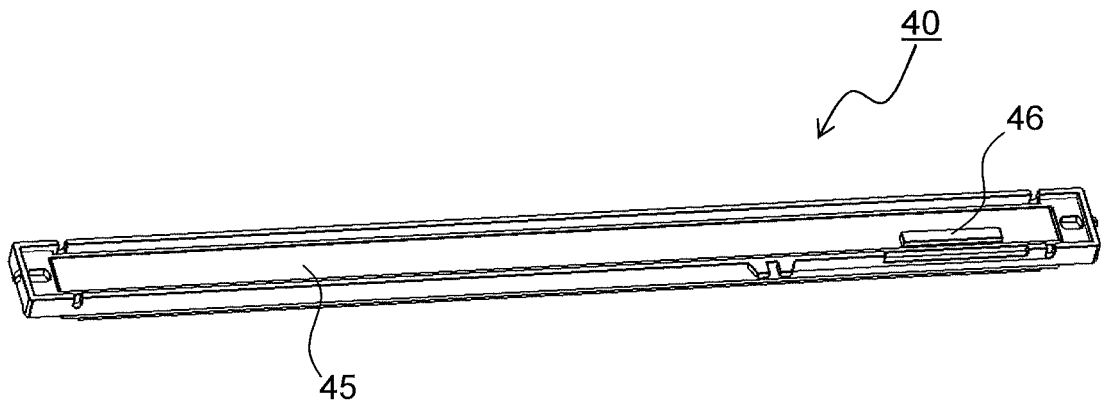
FIG. 8 is a perspective view of the CIS incorporated in the carriage main body as seen from the bottom.

FIG. 5 is an exterior perspective view of the CIS carriage 35, and FIG. 6 is an exterior perspective view of the carriage main body 37 that forms the CIS carriage 35. FIGS. 7 and 8 are perspective views of the CIS 40 incorporated in the carriage main body 37 as seen from the top and the bottom face side respectively.

The carriage main body 37 includes a CIS housing portion 37a in which the CIS 40 is housed and shaft guide portions 37b in which the shafts 47 of the unit housing 31 are slidably inserted. The CIS housing portion 37a is provided substantially over the entire region of the carriage main body 37 in the longitudinal direction. There are provided two shaft guide portions 37b at each end part of the carriage main body 37 in the longitudinal direction, that is, two pairs of shaft guide portions 37b in the sheet conveying direction.

In the CIS 40, a large number of detection portions 43 comprising photoelectric conversion elements are arranged in the sheet width direction (in the left-right direction in FIG. 7). The detection portions 43 are mounted on the top face of the CIS substrate 45. On the bottom-face side (the side opposite to the detection portions 43) of the CIS substrate 45, there is provided a CIS-side connector 46 to which one end part of an FFC 67 (see FIG. 21) is connected.

Figure 9:
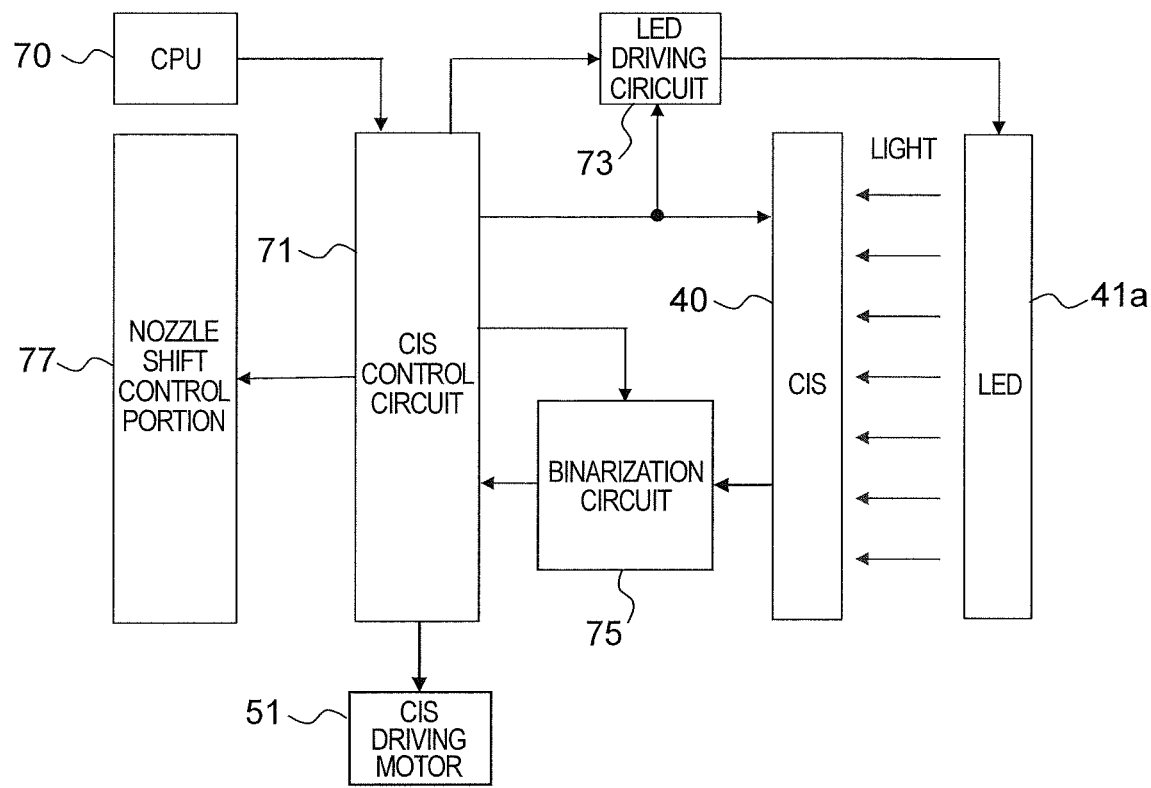
FIG. 9 is a block diagram showing control paths of the printer of this embodiment.

FIG. 9 is a block diagram showing the control paths of the printer 100 of this embodiment. A CPU 70 controls the whole printer 100 comprehensively. When printing operation by the printer 100 on a sheet P is started based on printing data received from an external computer or the like, the CPU 70 makes various settings on a CIS control circuit 71 for reading signals from the CIS 40. The CPU 70, based on sheet size information included in the received printing data, transmits a control signal to a CIS driving motor 51 and makes the CIS carriage 35 in the sensor unit 30 move by a predetermined distance.

The CIS control circuit 71, according to the settings made by the CPU 70, sends to the CIS 40 a reference clock signal for reading a signal from the CIS 40 and an accumulation time determination signal for determining the electric charge accumulation time in the CIS 40. The CIS control circuit 71 sends a PWM signal to an LED driving circuit 73 for setting the value of a current to pass in the LED 41a. The LED driving circuit 73 generates a direct-current voltage in accordance with the PWM signal from the CIS control circuit 71 and makes it a reference voltage of the current to pass in the LED 41a. The CIS control circuit 71 generates a comparison reference voltage (threshold voltage) for binarizing in a binarization circuit 75 an analogue signal (output signal) from the CIS 40.

At the timing when a sheet P in a standby state at the registration roller pair 13 (see FIG. 3) is about to be conveyed toward the recording portion 9 (see FIG. 1), the CPU 70 instructs the CIS control circuit 71 to sense the edge position. On receiving the instruction from the CPU 70 to sense the edge position, the CIS control circuit 71 synchronizes with an accumulation time determination signal and sends to the LED driving circuit 73 a control signal for turning on the LED 41a. The LED driving circuit 73, according to the control signal from the CIS control circuit 71, turns on the LED 41a for a certain period.

In response to the next accumulation time determination signal and reference clock signal, the CIS 40 outputs a voltage equivalent to the quantity of light accumulated while the LED 41a is on in each pixel (photoelectric conversion element) in a pixel group of the detection portions 43 one pixel at a time as an output signal. The output signal output from the CIS 40 is binarized in the binarization circuit 75 by being compared with the comparison reference voltage (threshold voltage) and is input to the CIS control circuit 71 as a digital signal.

The CIS control circuit 71, for each output signal output by the CIS 40, checks whether the value of the digital signal binarized in the binarization circuit 75 is 0 or 1 sequentially one pixel at a time. Then, the CIS control circuit 71 senses the position (position of the photoelectric conversion element) of the pixel in the detection portions 43 where the value of the digital signal changes from 0 to 1 or from 1 to 0.

When the CIS control circuit 71 senses the position of the pixel where the value of the digital signal has changed, the position of the changed pixel is determined to be the edge position of a sheet P in its width direction. The CPU 70 calculates the amount of deviation between the edge position determined by the CIS control circuit 71 and the edge position (reference edge position) when a sheet P is conveyed at an ideal conveying position (reference conveying position) where the sheet P passes along the center position of the sheet-passing region. The calculated deviation amount is transmitted to a nozzle shift control portion 77. The nozzle shift control portion 77, according to the transmitted deviation amount of a sheet P in its width direction, shifts the use region of ink ejecting nozzles of the line heads 10C to 10K in the recording portion 9.

Figure 10:
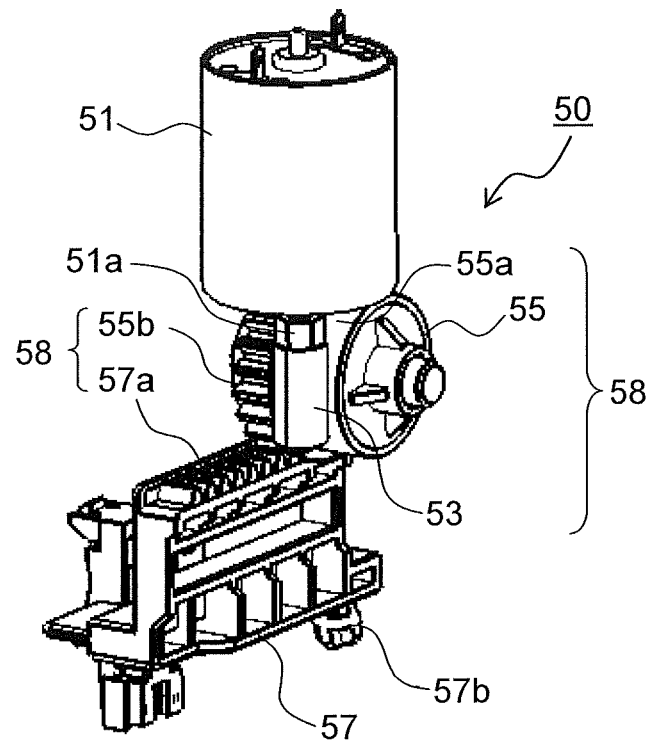
FIG. 10 is a perspective view of a carriage moving mechanism provided in the sensor unit of this embodiment.
Figure 11:
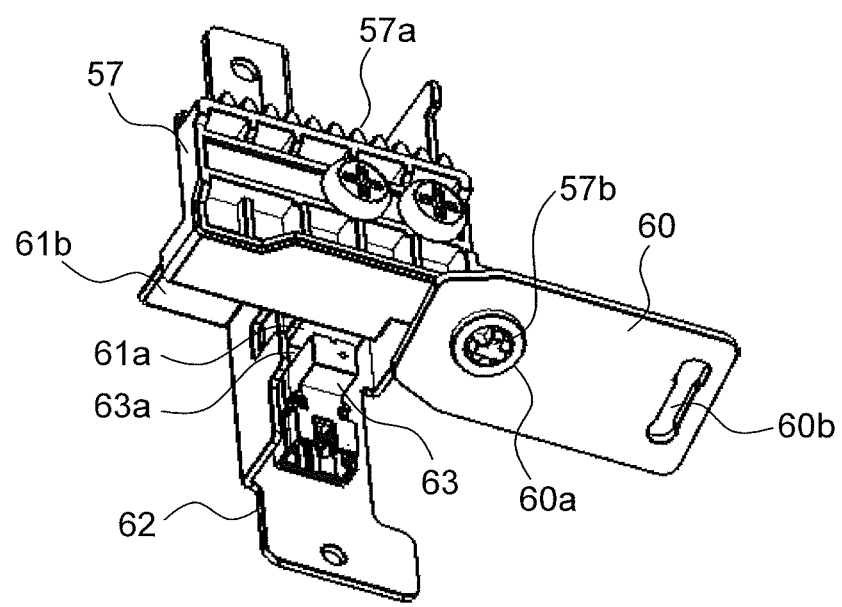
FIG. 11 is a perspective view of and around a rack that forms the carriage moving mechanism as seen from the bottom.
Figure 12:
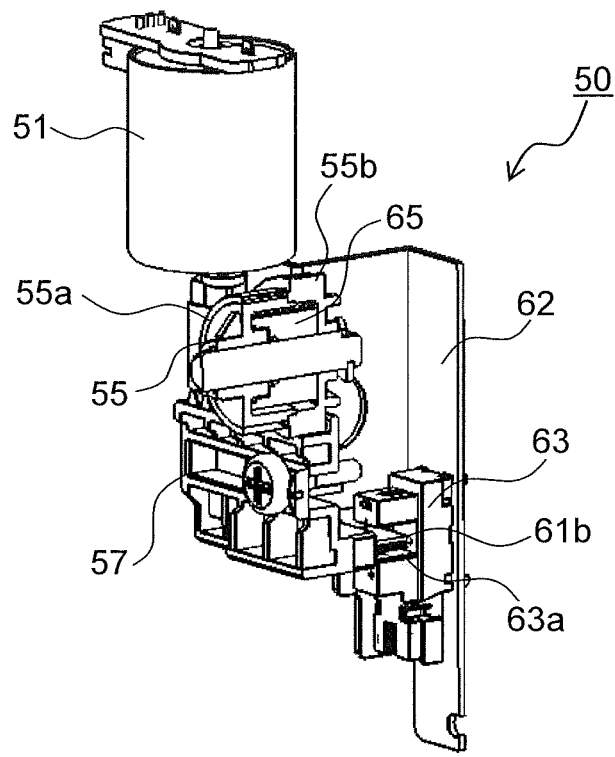
FIG. 12 is a perspective view of the carriage moving mechanism including a cross section cut along a rotary shaft of a two-stage gear.

Next, the moving mechanism of the CIS carriage 35 in the sensor unit 30 of this embodiment will be described. FIG. 10 is a perspective view of the carriage moving mechanism 50 provided in the sensor unit 30 of this embodiment. FIG. 11 is a perspective view of and around a rack 57 that forms the carriage moving mechanism 50 as seen from below. FIG. 12 is a perspective view of the carriage moving mechanism 50, including a cross section of a two-stage gear 55 cut along its rotary shaft.

The carriage moving mechanism 50 has the CIS driving motor 51 (a motor) and a drive transmission gear train 58 that includes a worm gear 53 (drive output gear), the two-stage gear 55, and the rack 57. The worm gear 53 is fixed to a rotary shaft 51a of the CIS driving motor 51.

The two-stage gear 55 includes a small-diameter portion 55a (first gear) and a large-diameter portion 55b (second gear) and meshes, at the small-diameter portion 55a, with the worm gear 53. As shown in FIG. 12, the two-stage gear 55 incorporates a torque limiter 65 such that, when the rotation load applied to the two-stage gear 55 surpasses a predetermined torque, the small-diameter portion 55a and the large-diameter portion 55b are rotatable independently of each other.

The rack 57 includes rack teeth 57a that mesh with the large-diameter portion 55b of the two-stage gear 55. On the bottom face of the rack 57, there is provided an engaging projection 57b that engages with an engaging hole 60a formed at one end part of a coupling plate 60. At the other end part of the coupling plate 60, a screw fixing hole 60b is formed. From a side face of the rack 57, a first light-shielding plate 61a and a second light-shielding plate 61b project. At a position facing the first light-shielding plate 61a and the second light-shielding plate 61b of the rack 57, a PI (photointerruptor) sensor 63 (unit position detection sensor) is arranged. The PI sensor 63 is fixed to the unit housing 31 (see FIG. 2) via a sensor holding stay 62.

As the rack 57 moves, the first light-shielding plate 61a and the second light-shielding plate 61b shield a detection portion 63a of the PI sensor 63, and thus the light reception signal level changes from HIGH to LOW. When the first light-shielding plate 61a and the second light-shielding plate 61b retract from the detection portion 63a, the light reception signal level changes from LOW to HIGH. The light reception signal of the detection portion 63a is transmitted to the CPU 70 (see FIG. 9).

Figure 13:
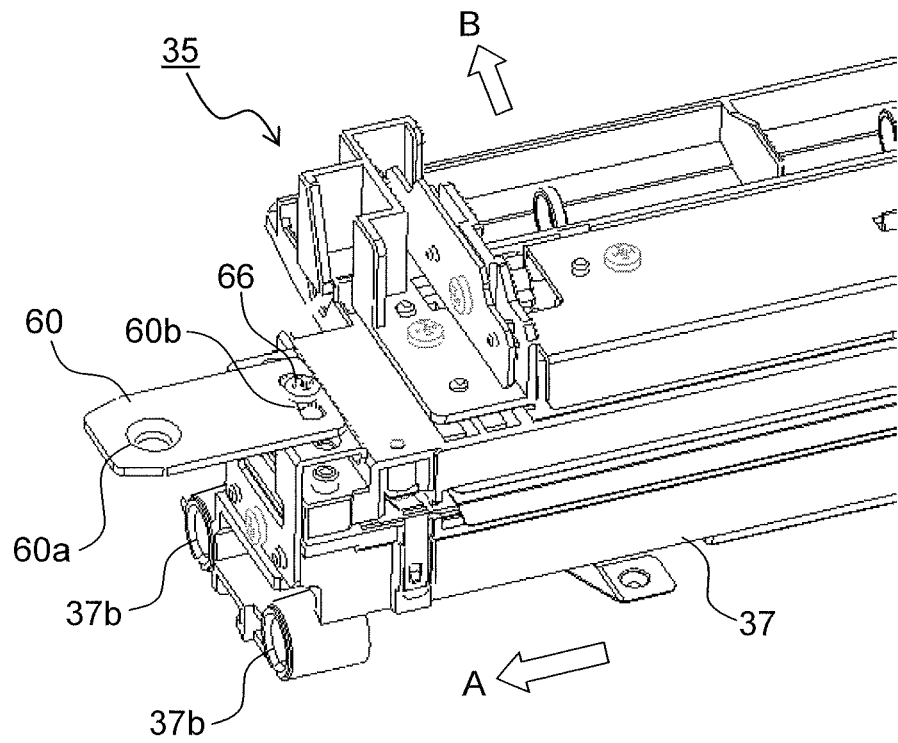
FIG. 13 is a partial perspective view of an end part of the CIS carriage on the front side.
Figure 14:
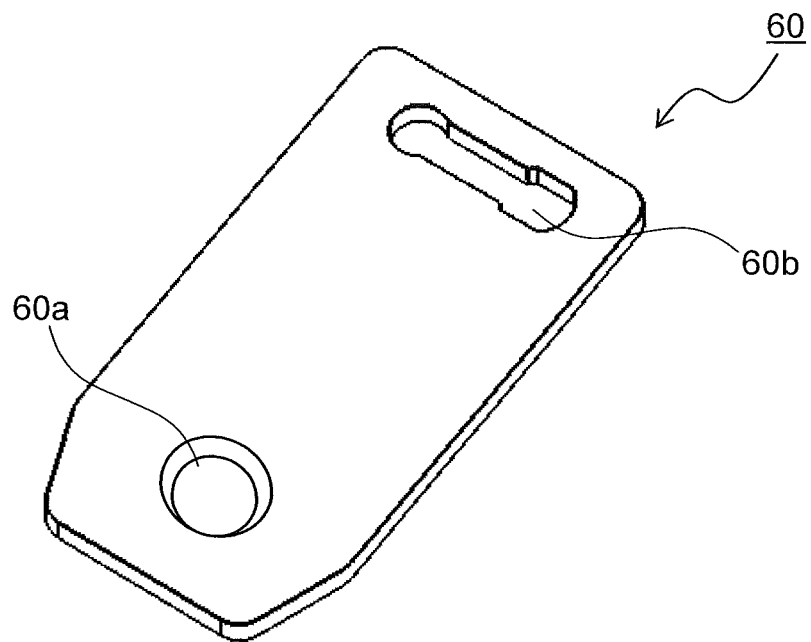
FIG. 14 is a perspective view of a coupling plate fixed on the CIS carriage.

FIG. 13 is a partial perspective view of an end part of the CIS carriage 35 on the front side (in the arrow A direction). FIG. 14 is a perspective view of the coupling plate 60 fixed on the CIS carriage 35. The coupling plate 60 is made of metal and, as shown in FIG. 13, is fixed to the CIS carriage 35 with a screw 66 tightened into the screw fixing hole 60b.

As shown in FIG. 14, at one end part of the coupling plate 60, there is formed a round engaging hole 60a with which the engaging projection 57b of the rack 57 engages. The inner diameter of the engaging hole 60a is formed slightly larger than the outer diameter of the engaging projection 57b. At the other end part of the coupling plate 60, the elongate screw fixing hole 60b extending in the conveying direction (in the arrow B direction) is formed.

Making the screw fixing hole 60b elongate allows the fixed position of the coupling plate 60 with respect to the CIS carriage 35 to be changed in the conveying direction. With this, the deviation of the CIS carriage 35 in the conveying direction (in the sub scanning direction) can be adjusted within the range of the screw fixing hole 60b, and thus, even if the relative position between the CIS carriage 35 and the rack 57 deviates in the conveying direction due to component tolerances and the like, adjusting the fixed position of the coupling plate 60 allows reliably engagement between the engaging projection 57b on the rack 57 and the engaging hole 60a in the coupling plate 60.

Figure 15:
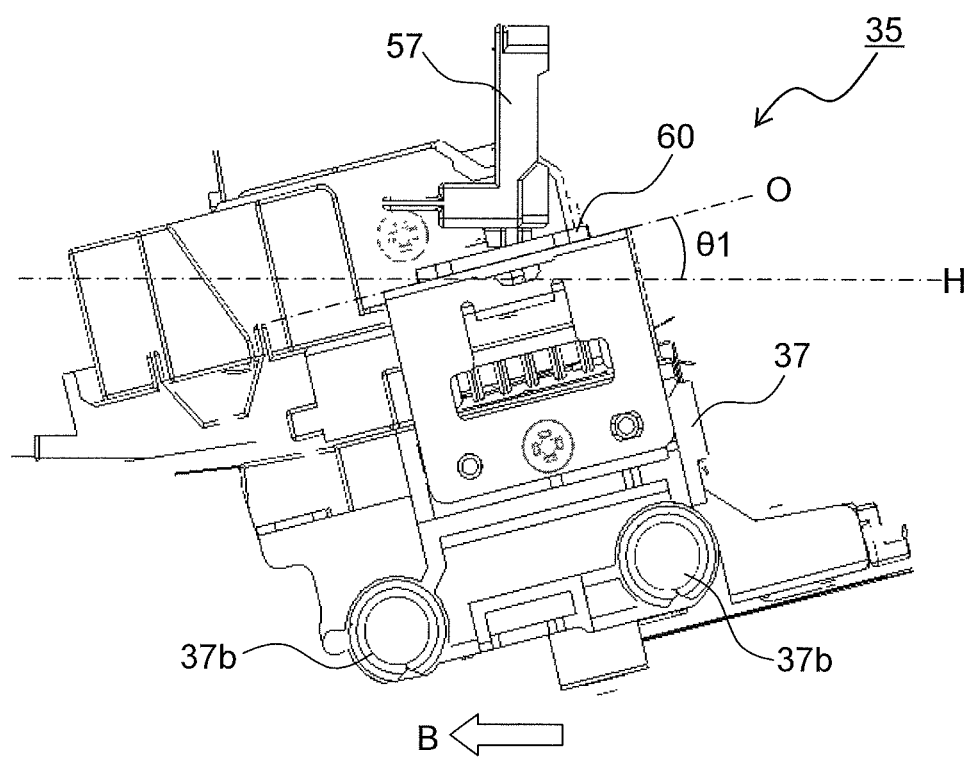
FIG. 15 is a side view of the CIS carriage as seen from the front side (from the left direction in FIG. 13)
Figure 16:
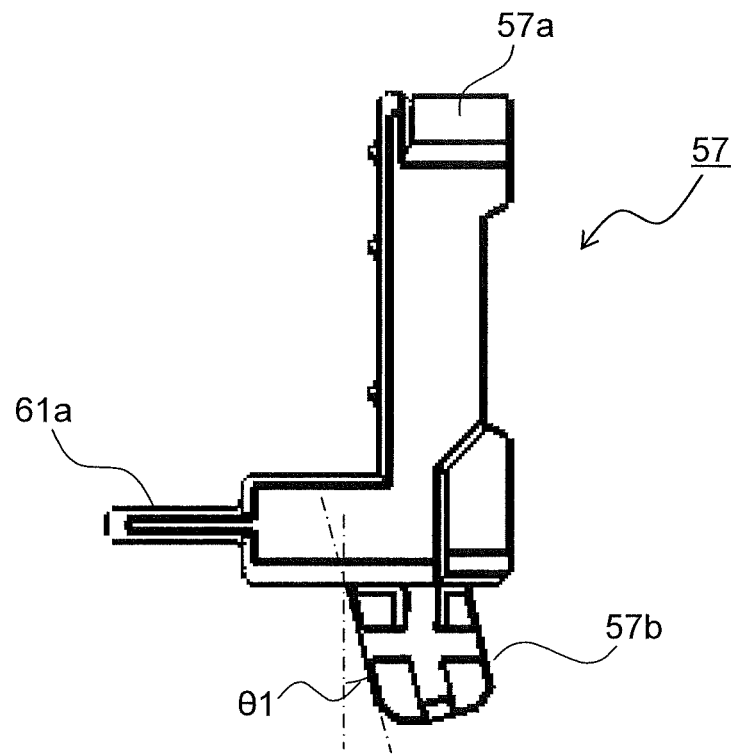
FIG. 16 is a side view of the rack as seen from the front side (from the left direction in FIG. 13)

FIG. 15 is a side view of the CIS carriage 35 as seen from the front side (from the left direction in FIG. 13). FIG. 16 is a side view of the rack 57 as seen from the front side (from the left direction in FIG. 13). As shown in FIG. 15, the CIS carriage 35 is arranged with an inclination of θ1 with respect to the horizontal plane H such that the downstream side in the conveying direction (the left side in FIG. 15) is lower. Thus, the coupling plate 60 fixed to the CIS carriage 35 and an opening face O of the engaging hole 60a formed in the coupling plate 60 are also inclined at θ1 with respect to the horizontal plane H.

On the other hand, as shown in FIG. 16, the engaging projection 57b on the rack 57 projects from the bottom face of the rack 57 with an inclination of θ1 toward the upstream side in the conveying direction. With this, the projecting direction of the engaging projection 57b is substantially perpendicular to the opening face O of the engaging hole 60a, and thus, when CIS carriage 35 reciprocates, the engaging projection 57b and the engaging hole 60a are less prone to disengage from each other.

Next, a procedure for switching the arrangement of the CIS carriage 35 will be described. If the sheet size information included in printing data received from an external computer or the like indicates a standard size (A3 size or smaller), the CIS carriage 35 is moved to the front side (in the arrow A direction) of the printer 100.

Specifically, by rotating the CIS driving motor 51 in a predetermined direction, the rack 57 is moved in the arrow A direction via the worm gear 53 and the two-stage gear 55. With this, the CIS carriage 35 coupled with the rack 57 by the coupling plate 60 also moves in the arrow A direction while sliding along the shafts 47.

Figure 17:
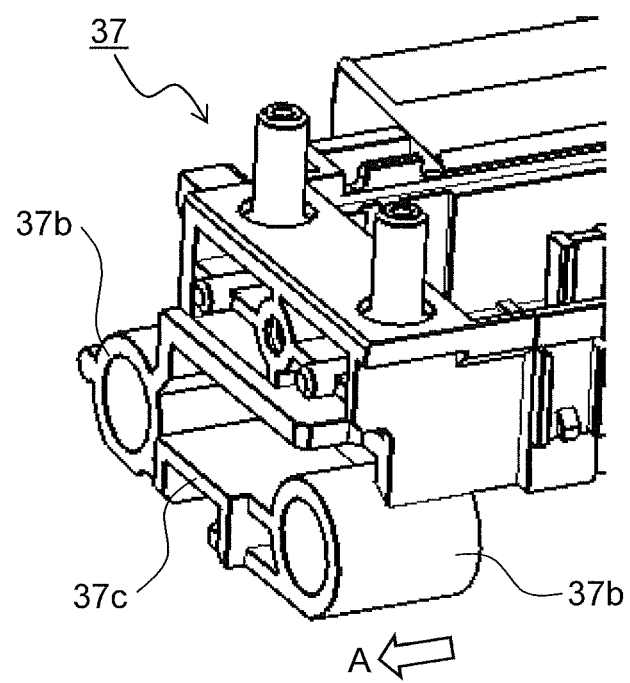
FIG. 17 is a partial perspective view of an end part of the carriage main body on the front side.
Figure 18:
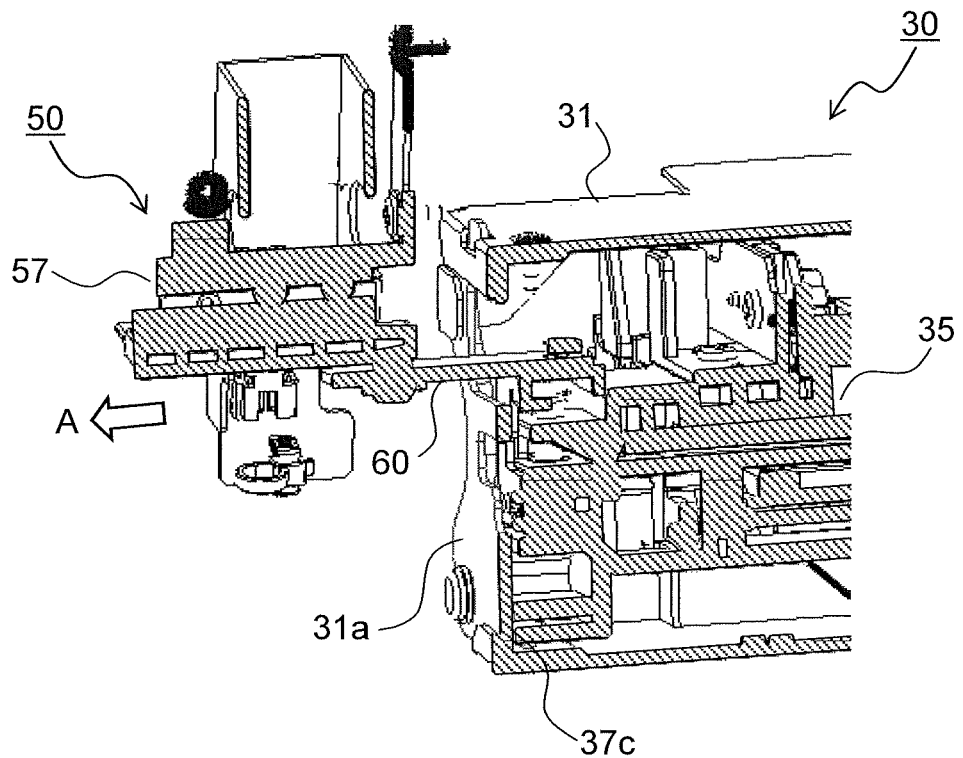
FIG. 18 is a partial cross-sectional view of an end part of the sensor unit on the front side showing a state where the CIS carriage has moved to the front side.

FIG. 17 is a partial perspective view of an end part of the carriage main body 37 on the front side (in the arrow A direction). FIG. 18 is a partial cross-sectional view of an end part of the sensor unit 30 on the front side, showing a state where the CIS carriage 35 has moved to the front side (in the arrow A direction). As shown in FIG. 17, a first contact face 37c projects farthest in the arrow A direction at the front side of the carriage main body 37. Thus, when the CIS carriage 35 moves a predetermined distance in the arrow A direction, as shown in FIG. 18, the first contact face 37c of the carriage main body 37 makes contact with the inner face of the side face frame 31a (a first side face) of the unit housing 31. Here, the CIS carriage 35 is arranged at the position (a home position, a first position) at which it has moved farthest to the front side. With this, the detection portion 43 (effective reading area) of the CIS 40 is arranged to overlap edge portions of an A3-size sheet at both sides in its width direction.

On the other hand, if the sheet size information indicates a large size larger than the A3 size, the CIS carriage 35 is moved to the rear side (in the arrow A' direction) of the printer 100. Specifically, by rotating the CIS driving motor 51 in the reverse direction, the rack 57 is moved in the arrow A' direction via the worm gear 53 and the two-stage gear 55. With this, the CIS carriage 35 coupled with the rack 57 by the coupling plate 60 also moves in the arrow A' direction while sliding along the shafts 47.

Figure 19:
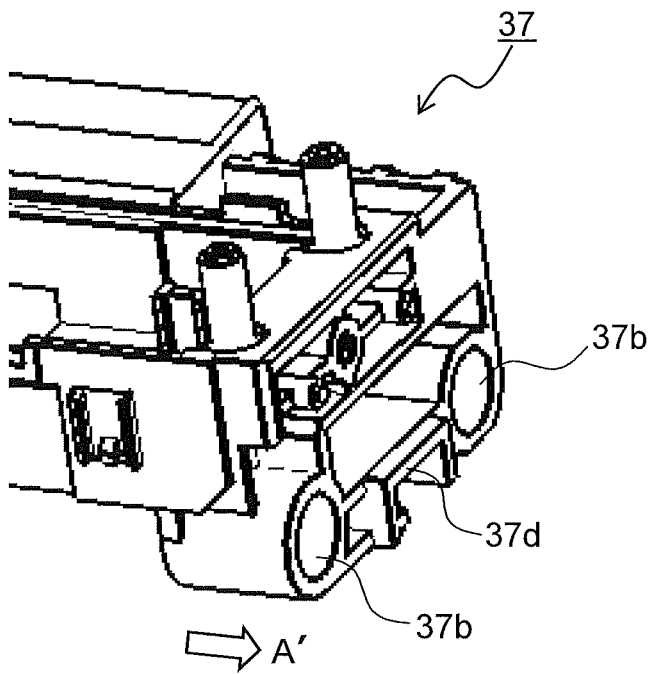
FIG. 19 is a partial perspective view of an end part of the CIS carriage on the rear side.
Figure 20:
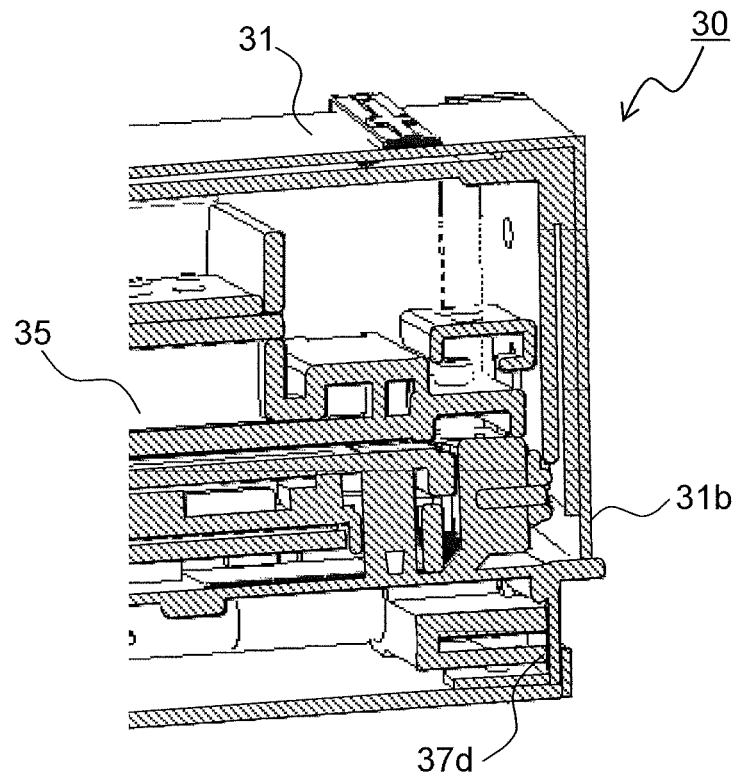
FIG. 20 is a partial cross-sectional view of an end part of the sensor unit on the rear side showing a state where the CIS carriage has moved to the rear side.

FIG. 19 is a partial perspective view of an end part of the carriage main body 37 on the rear side (in the arrow A' direction). FIG. 20 is a partial cross-sectional view of an end part of the sensor unit 30 on the rear side, showing a state where the CIS carriage 35 has moved to the rear side (in the arrow A' direction). As shown in FIG. 19, a second contact face 37d projects farthest in the arrow A' direction at the rear side of the carriage main body 37. Thus, when the CIS carriage 35 moves a predetermined distance in the arrow A' direction, as shown in FIG. 20, the second contact face 37d of the carriage main body 37 makes contact with the inner face of the side face frame 31b (a second side face) of the unit housing 31. Here, the CIS carriage 35 is arranged at the position (a second position) at which it has moved farthest to the rear side. With this, the detection portion 43 (effective reading area) of the CIS 40 is arranged to overlap an edge portion of a large-size sheet on the rear side.

In this embodiment, the CIS driving motor 51 continues to rotate for a certain period after the first contact face 37c and the second contact face 37d of the carriage main body 37 make contact with the inner face of each side frame 31a and 31b. The rotation torque of the torque limiter 65 is set smaller than the torque applied to the two-stage gear 55 when the CIS driving motor 51 rotates with the first contact face 37c and the second contact face 37d in contact with the side face frames 31a and 31b.

With this, after the first contact face 37c and the second contact face 37d of the carriage main body 37 make contact with the inner face of each side face frame 31a and 31b until the CIS driving motor 51 stops, the small-diameter portion 55a and the large-diameter portion 55b of the two-stage gear 55 rotate independently of each other.

With this embodiment, the first contact face 37c and the second contact face 37d of the carriage main body 37 make contact with the inner face of the side face frames 31a and 31b of the unit housing 31 and thereby the CIS carriage 35 is positioned at the first position or the second position. Accordingly, it is possible to improve the positional repeatability when the CIS carriage 35 reciprocates repeatedly between the first and second positions.

It is also possible, without placing a load on the CIS driving motor 51, to stabilize the pressing force of the carriage main body 37 against the side frames 31a and 31b utilizing the rotation load of the torque limiter 65. Accordingly, when the CIS driving motor 51 is stopped, the worm gear 53, the two-stage gear 55, and the rack 57 have no backlash, and thus the positioning accuracy of the CIS carriage 35 is improved.

When the first contact face 37c makes contact with the side face frame 31a, as shown in FIG. 11, the first light-shielding plate 61a of the rack 57 shields the detection portion 63a of the PI sensor 63. On the other hand, when the second contact face 37d makes contact with the side face frame 31b, the second light-shielding plate 61b of the rack 57 shields the detection portion 63a of the PI sensor 63. As a result, when the CIS carriage 35 reciprocates normally between the first and second positions, the light reception signal level of the PI sensor 63 changes from LOW to HIGH and then to LOW. When the change in the light reception signal level is sensed by the CPU 70 (see FIG. 9), it is judged that the CIS carriage 35 has reciprocated normally.

When the light reception signal level of the PI sensor 63 does not change from the LOW or HIGH state even if the CIS driving motor 51 is driven, it is judged that an operation failure has occurred in the CIS carriage 35 or the CIS driving motor 51 has been damaged, and an error is displayed on the operation panel (unillustrated) of the printer 100. That is, the PI sensor 63 functions as an error detection device for reciprocating operation of the CIS carriage 35.

With this configuration, it is possible to sense an operation failure in the reciprocating movement of the CIS carriage 35 between the first and second positions using one PI sensor 63. Accordingly, compared to the configuration in which separate sensors are arranged at the first and second positions to sense an operation failure, the number of sensors can be reduced.

Figure 21:
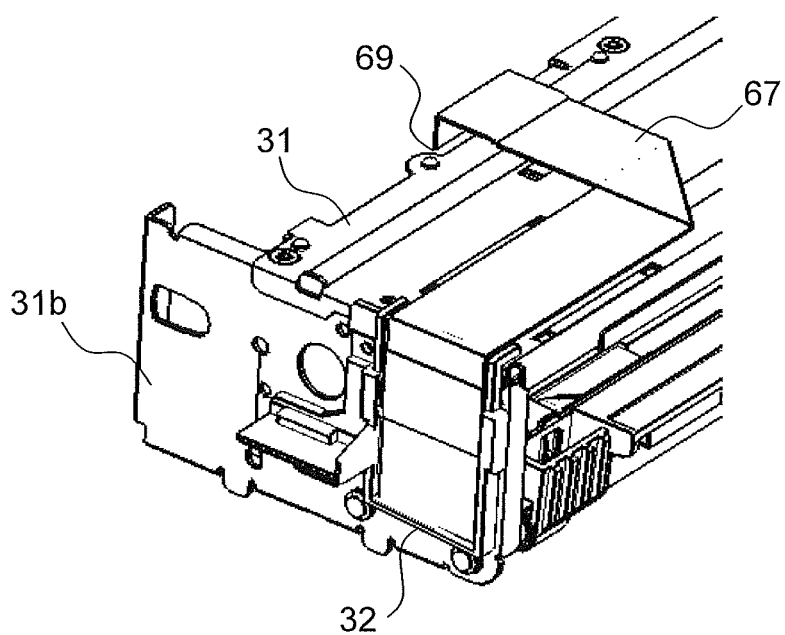
FIG. 21 is a partial perspective view of and around an end part of the sensor unit on the rear side.
Figure 22:
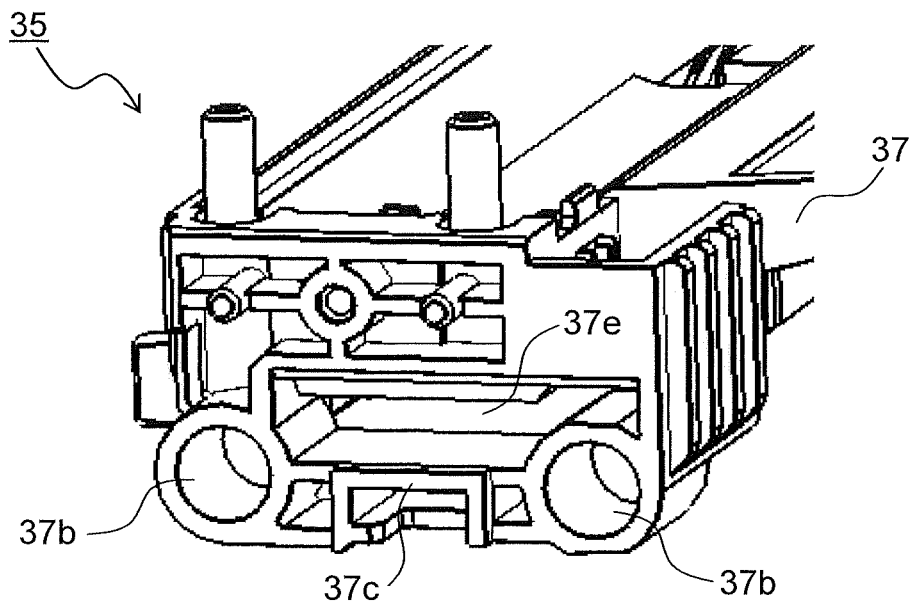
FIG. 22 is a partial cross-sectional view of an end part of the sensor unit on the rear side showing a state where the CIS carriage has moved to the rear side.

Next, wiring of the FFC (flexible flat cable) 67 to the CIS carriage 35 will be described. FIG. 21 is a partial perspective view of and around an end part of the sensor unit 30 on the rear side in this embodiment. FIG. 22 is a partial perspective view of and around an end part of the CIS carriage 35 on the rear side.

The FFC 67 is a ribbon-like wiring cable having a plurality of conductive wires arranged parallel to each other in a coating member. The FFC 67 has excellent flexibility and is bendable into any desired shapes, and thus the wiring space can be reduced. In this embodiment, one end part of the FFC 67 is connected to the CIS-side connector 46 (see FIG. 8) of the CIS 40 via a cable insertion hole 32 (a second guide hole) formed in the side frame 31b and a cable guide hole 37e (a first guide hole) formed in an end part of the carriage main body 37 on the rear side.

The other end part of the FFC 67 is bent upward from the cable insertion hole 32, is wired along the top face of the unit housing 31, is folded back at right angles, and is connected to a unit housing-side connector 69. FIG. 21 shows a state where the CIS carriage 35 is arranged at the first position, in which state the FFC 67 is wired along the side face frame 31b without a sag.

Figure 23:
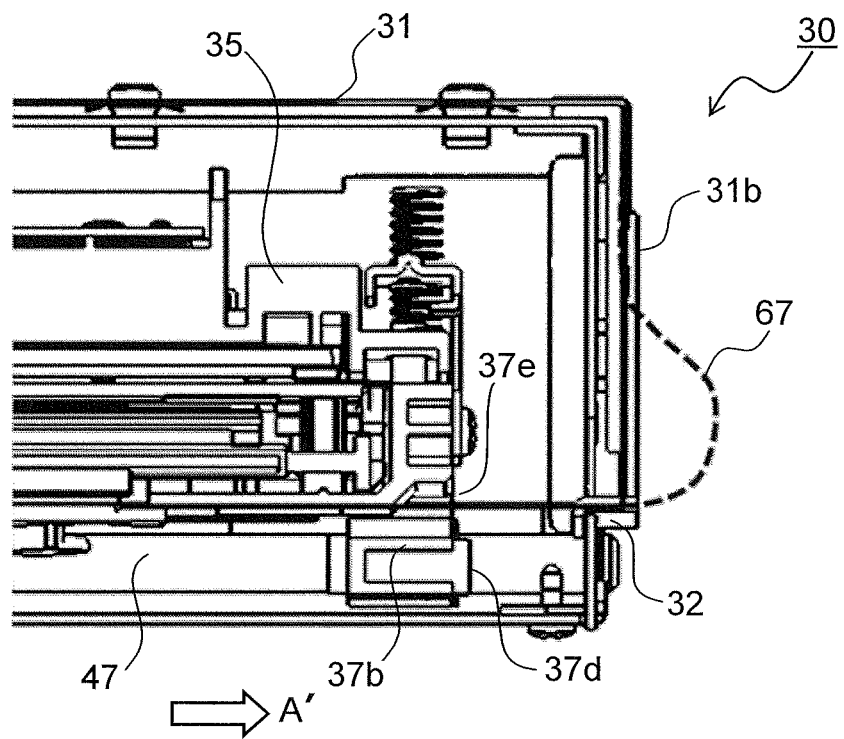
FIG. 23 is a partial cross-sectional view of and around an end part of the sensor unit on the rear side cut along its longitudinal direction.

FIG. 23 is a partial cross-sectional view of and around an end part of the sensor unit 30 on the rear side cut along its longitudinal direction. FIG. 23 shows a state where the CIS carriage 35 is in the middle of moving from the first position to the second position, in which state the FFC 67 led out of the cable insertion hole 32 sags outward of the side face frame 31b.

With the configuration of this embodiment, the CIS carriage 35 slides between the first and second positions along the two shafts 47, and this allows the CIS carriage 35 to stably reciprocate without rattle. With this, when the CIS carriage 35 reciprocates, no unnecessary load is placed on the FFC 67 coupled with the CIS carriage 35, and this prevents the FFC 67 from being damaged.

The cable insertion hole 32 for leading the FFC 67 out of the unit housing 31 and the cable guide hole 37e for leading the FFC 67 out of the CIS carriage 35 are arranged in the axial direction of the shaft 47, and thus the FFC 67 can sag outside the side face frame 31b along the plane. With this, when the CIS carriage 35 reciprocates, it is possible to prevent the FFC 67 from twisting or bending, and thus the disconnection of the FFC 67 can be prevented.

The embodiment described above is in no way meant to limit the present disclosure, which thus allows for many modifications and variations within the spirit of the present disclosure. For example, the above embodiment deals with an example of using a CIS 40 of a transmissive type provided with the detection portion 43 for receiving laser light from the light source portion 41. Instead, for example, a CIS 40 of a reflective type that has a light emitting portion for emitting light to the sheet P and that senses reflected light from the sheet P at the detection portion 43 may be used to determine the edge position of the sheet P based on the intensity difference between the reflected light from the sheet P and that from a non-sheet P passage area. In that case, it is preferable to arrange a background member in a color different from that of a sheet P (white) at a position facing the detection portion 43 of the CIS 40, so that the intensity difference between the reflected light from the sheet P and that from the non-sheet P passage area becomes larger.

Although the above embodiment also deals with an example of using the CIS 40 as a sensor for sensing the edge position of a sheet P, any sensor other than a CIS, such as a CCD, may be used.

Although the embodiment described above deals with, as an example, a printer 100 of an ink-jet recording type which ejects ink onto a sheet P from ink ejection nozzles of line heads 10C to 10K to record an image, the present disclosure is not limited to printers 100 of an ink-jet recording type. Instead, the present disclosure may be applied, for example, to image forming apparatuses of an electrophotographic type which irradiate with laser an image carrier such as a photosensitive drum to form an electrostatic latent image, attach toner to the electrostatic latent image to form a toner image, transfer the toner image onto a sheet (recording medium), and apply heat and pressure to the transferred unfixed toner to form a permanent image.

What is claimed is:

1. A sensor unit comprising:
   an edge detection sensor which is arranged in a conveying portion for conveying a sheet and senses an edge position of a sheet in a sheet width direction perpendicular to a sheet conveying direction;
   a sensor carriage having a carriage main body in which the edge detection sensor is incorporated;
   a unit housing which houses the sensor carriage and reciprocatably supports the sensor carriage in the sheet width direction; and
   a carriage moving mechanism which makes the sensor carriage reciprocate in the sheet width direction,
   wherein
   the sensor carriage is selectively positioned at a first position where the sensor carriage makes contact with a first side face at one end side of the unit housing in the sheet width direction or at a second position where the sensor carriage makes contact with a second side face at another end side in the sheet width direction.

2. The sensor unit according to claim 1,
   wherein
   the carriage main body includes
      a first contact face which projects toward one end side in the sheet width direction, and
      a second contact face which projects toward another end side in the sheet width direction, and
   the first contact face makes contact with the first side face and thereby the sensor carriage is positioned at the first position, and the second contact face makes contact with the second side face and thereby the sensor carriage is positioned at the second position.

3. The sensor unit according to claim 2,
   wherein
   the unit housing has two shafts which are each supported on the first side face and the second side face, and
   the carriage main body is provided, at opposite end parts thereof in the sheet width direction, with a pair of shaft guide portions which are arranged at a predetermined interval in the sheet conveying direction and in which the two shafts are slidably inserted.

4. The sensor unit according to claim 3,
   wherein
   to the edge detection sensor, a flexible flat cable having a plurality of conductive wires arranged parallel to each other in a coating member is connected,
   in the second contact face of the carriage main body, a first guide hole is formed, and in the second side face of the unit housing, a second guide hole is formed at a position overlapping the first guide hole so as to penetrate the second side face of the unit housing in the axial direction of the shaft, and
   the flexible flat cable is guided to outside the unit housing via the first guide hole and the second guide hole.

5. The sensor unit according to claim 1,
   wherein
   the carriage moving mechanism includes
      a motor, and
      a drive transmission gear train having a plurality of gears which transmit a driving force of the motor to the sensor carriage,
   the motor continues to drive for a predetermined time after the sensor carriage has moved to the first position or the second position, and
   one of the plurality of gears is a double gear having a first gear and a second gear which are arranged on a same axis, and
   the double gear includes a torque limiter which couples the first gear and the second gear and which, when a rotation load applied to the first gear and the second gear exceeds a predetermined value, uncouples the first gear and the second gear.

6. The sensor unit according to claim 5,
   wherein
   the drive transmission gear train includes
      a drive output gear which is fixed to a rotary shaft of the motor and meshes with the first gear, and
      a rack gear which is formed on a rack connected to the carriage main body to reciprocate together with the sensor carriage and which meshes with the second gear.

7. The sensor unit according to claim 6,
   wherein
   the unit housing is provided with a unit position detection sensor therein,
   the rack is provided with a first detected plate and a second detected plate to switch a detection portion of the unit position detection sensor between a detection state and a non-detection state, and
   when the first detected plate switches the detection portion from the non-detection state to the detection state, the sensor carriage is sensed to have moved to the first position, and when the second detected plate switches the detection portion from the non-detection state to the detection state, the sensor carriage is sensed to have moved to the second position.

8. The sensor unit according to claim 6,
   wherein
   the sensor carriage has the carriage main body and a coupling plate which projects from one end side of the sensor carriage outward in the sheet width direction to couple the carriage main body and the rack,
   the rack is provided with an engaging projection which engages with an engaging hole provided in the coupling plate,
   the coupling plate is arranged with an inclination of a predetermined angle in the sheet conveying direction with respect to a bottom face of the rack, and
   the engaging projection is inclined the predetermined angle from the bottom face of the rack and projects substantially perpendicular to an opening face of the engaging hole.

9. The sensor unit according to claim 8,
   wherein
   the engaging hole is formed at one end side of the coupling plate, and a screw fixing hole for fixing the coupling plate and the carriage main body with a screw is formed at another end side of the coupling plate, and the screw fixing hole is in an elongate shape extending in the sheet conveying direction.

10. The sensor unit according to claim 1, wherein the edge detection sensor is a contact image sensor having a plurality of photoelectric conversion elements which are arrayed along the sheet width direction, and a position of the photoelectric conversion element at which a value of a digital signal obtained by binarizing an output signal of the contact image sensor changes is judged to be an edge position in the sheet width direction.

11. An image forming apparatus comprising:

a conveying portion which conveys a sheet;

an image forming portion which forms an image on the sheet conveyed by the conveying portion;

the sensor unit according to claim 1 arranged on an upstream side of the image forming portion in the sheet conveying direction; and a control portion which corrects a position of image formation by the image forming portion in a sheet width direction based on an edge position of the sheet, in the sheet width direction perpendicular to the sheet conveying direction, sensed by the sensor unit.

* * * * *